June 25, 1946.   G. E. DATH   2,402,536
FRICTION SHOCK ABSORBER
Filed Oct. 30, 1943
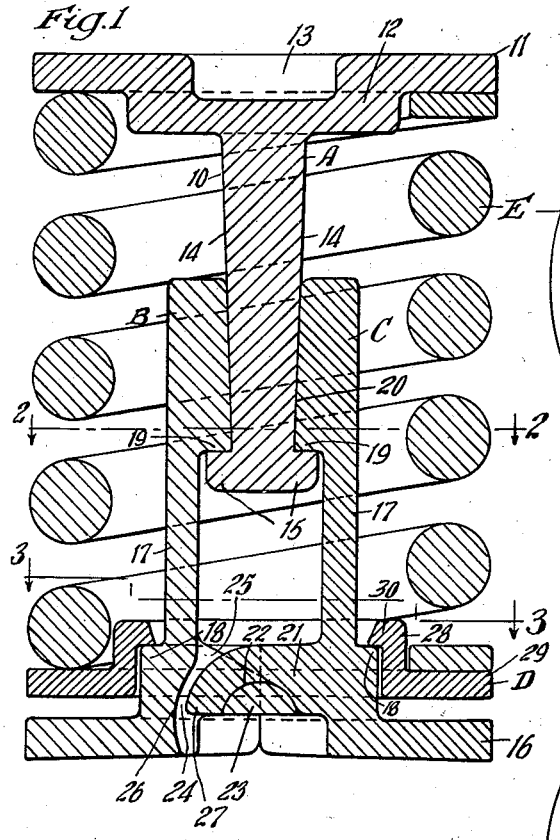
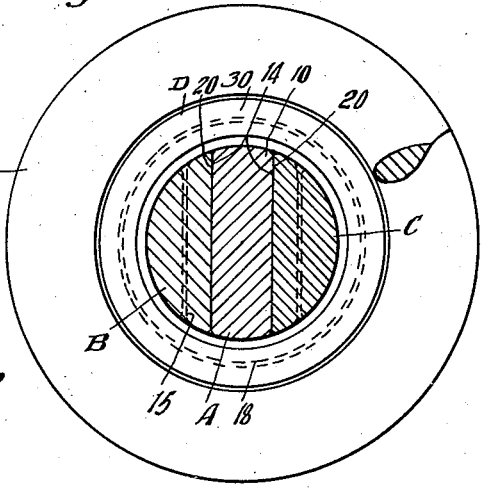
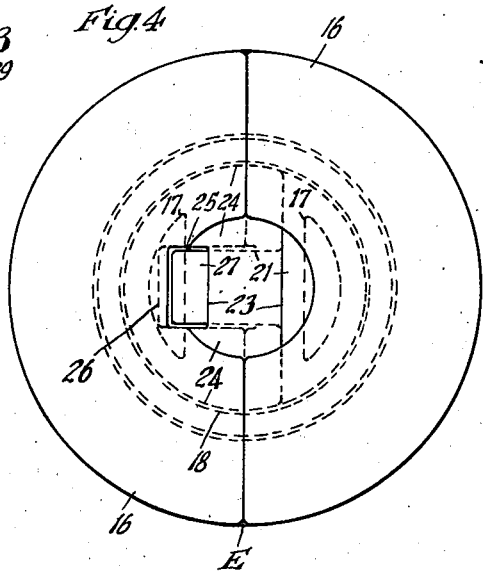
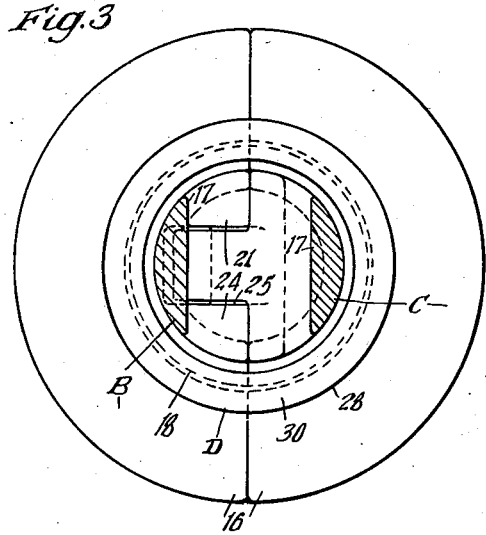
Inventor
George E. Dath
By Henry Fuchs.
Atty.

Patented June 25, 1946

2,402,536

UNITED STATES PATENT OFFICE 2,402,536

FRICTION SHOCK ABSORBER

George E. Dath, Chicago, Ill., assignor to W. H. Miner, Inc., Chicago, Ill., a corporation of Delaware Application October 30, 1943, Serial No. 508,326

7 Claims. (Cl. 267—9)

This invention relates to improvements in friction shock absorbers, especially designed for snubbing or dampening the action of the springs of a railway car truck.

One object of the invention is to provide a friction shock absorber adapted to replace one or more of the spring units of a truck spring cluster of a railway car for snubbing the action of the truck springs.

Another object of the invention is to provide a friction shock absorbing mechanism of the character indicated comprising relatively slidable friction elements, including a tapered friction post and shoes embracing the post at opposite sides and having frictional engagement therewith, wherein the frictional contact is maintained by spring means which yieldingly opposes separation of the shoes by the tapered post and yieldingly resists relative movement of the post and shoes in lengthwise direction toward each other.

Other objects of the invention will more clearly appear from the description and claims hereinafter following.

In the drawing forming a part of this specification, Figure 1 is a transverse vertical sectional view of my improved friction shock absorber. Figures 2 and 3 are horizontal sectional views, corresponding respectively to the lines 2—2 and 3—3 of Figure 1, the spring being omitted in Figure 3. Figure 4 is a bottom plan view, looking upwardly in Figure 1.

As illustrated in the drawing, my improved friction shock absorber comprises broadly a friction post A; two friction shoes B and C; a spring follower plate or collar D; and a spring resistance E.

The friction post A comprises a relatively wide platelike portion 10, which forms the post member proper, having a laterally projecting annular flange 11 at the upper end which is in the form of a heavy disc having a downwardly offset central portion 12 which is formed with a central depression or recess 13 adapted to receive the usual spring centering projection of the top spring plate for the truck spring cluster of the railway car. The post member proper, which depends from the disclike portion 11, is tapered downwardly, as clearly shown in Figure 1, thus presenting flat friction surfaces 14—14 on opposite sides thereof which converge toward the bottom end of the post. At said bottom end, the post is provided with laterally, outwardly projecting, heavy flanges 15—15 at the friction surface sides thereof, forming, in effect, a head member presenting upwardly facing, horizontal stop shoulders.

The two friction shoes B and C are of similar design, except as hereinafter pointed out. Each shoe comprises a base portion 16 and an arm 17 upstanding therefrom. Each base portion is of semi-circular form, the two semi-circular base portions 16—16 together forming a complete circle, as shown in Figures 3 and 4, which is divided on its diameter. The lower end of each arm 17 immediately above the base portion 16 is laterally, outwardly enlarged, thereby providing a semi-circular ledge or shoulder 18 extending around the curved outer side of the arm. At the upper ends the arms 17 are laterally inwardly enlarged, thereby providing downwardly facing, horizontal stop shoulders 19—19 adapted to be engaged by the flanges 15—15 of the post to limit upward movement of the latter with respect to the shoes. Each shoe is provided with a longitudinally extending friction surface 20 on the inner side thereof at said inwardly enlarged portion, slidably engaged with the corresponding friction surface 14 of the post. The friction shoe C has a fulcrum portion or arm 21 projecting laterally from the inner side of the arm 17, toward the shoe B, said fulcrum portion being at a higher level than the base portion 16. At the outer end, the arm 21 is provided with a downwardly facing concave bearing seat 22 in its underneath side engaged over a pivot member 23 on a laterally, inwardly extending arm 24, projecting from the inner side of the arm 17 of the shoe B. Inwardly of the pivot member 23 the arm 24 is cut out, or slotted, as indicated at 25 to accommodate the outer end of the arm 21 in its pivotal movements. At the end of the opening 25, remote from the pivot member 23, the inner face of the arm 17 is formed with a concavity 26 adapted to provide clearance for the end of the arm 21 in its pivotal movement on the pivot member 23 of the arm 24, the extremity of the arm 21 being rounded, as indicated at 27, to correspond with the curvature of the concavity 26.

The underneath surfaces of the base portions 16—16 of the shoes B and C are substantially flat, and in the normal position of the parts are slightly inclined upwardly from a horizontal plane and toward the meeting edges of said portions, that is, the base portions are tilted slightly so that they are supported on their outer edges at diametrically opposite sides of the mechanism.

The spring follower plate or collar D comprises an upstanding cylindrical ringlike portion 28 having an outwardly extending annular flange 29 at the lower edge which forms an abutment for the spring E. At the upper end, the cylindrical ringlike portion is provided with a relatively narrow inturned flange 30. The spring follower collar D surrounds the shoes at the lower ends thereof and has the flange 30 engaged over the ledge 18 of the enlarged lower portions of the shoes B and C. The collar D is thus supported on the ledges 18—18.

The spring resistance E is composed of a single heavy coil having its top and bottom ends bearing respectively on the flange 11 of the post A and the spring follower plate or collar D. The spring E is under initial compression, thus forcing the collar D against the ledges of the shoes to urge the same inwardly against the friction surfaces of the post A.

In assembling the parts of my improved friction shock absorber, the shoes are first connected to each other by engaging the seat of the arm 21 of the shoe C over the pivot member 23 of the arm 24 of the shoe B. The upper ends of the arms 17—17 are then spread apart by raising the base portions 16—16 at their inner ends. To hold the shoes in this tilted position, a support in the form of a block is placed under the base portions 16—16. The spring follower collar D is then slipped over the shoes and the spring E placed around the shoes with the lower end resting on the collar D. The post A is then applied by inserting the same downwardly within the coil of the spring E and entering the same between the tilted shoes B and C. As the post is forced downwardly the spring E is compressed against the collar D. The post is forced downwardly until the stop flanges 15—15 pass beyond the shoulders 19—19 of the shoes. The support for the base portions is then removed, permitting the shoes B and C to swing into engagement with the post A under the pressure of the spring E, thereby bringing the parts to the assembled position shown in Figure 1 with the shoulders 19—19 in overhanging relation with the stop flanges 15—15 of the post.

The operation of the improved shock absorbing mechanism is as follows: Upon the cluster of springs of the railway car truck being compressed between the spring follower plates of the truck springs, the friction post A and the friction shoes B and C are moved toward each other in lengthwise direction against the resistance of the spring E. Due to the taper of the post, the cooperating ends of the shoes are spread apart and the shoes tilted against the resistance of the spring E which bears on the spring follower collar, which, in turn, bears on the ledges 18—18 of the shoes. The required frictional resistance to snub the action of the truck springs is thus produced between the friction surfaces of the post and shoes. Upon the spring follower plates of the truck springs being moved apart during recoil of the truck springs, the expansive action of the spring E restores all of the parts to the normal release position shown in Figure 1, separation of the post and shoes in lengthwise direction being limited by engagement of the stop flanges 15—15 of the post with the shoulders 19—19 of the shoes.

I claim:

1. In a friction shock absorber, the combination with a friction post; of friction shoes pivotally connected to each other and embracing said post at opposite sides, said post and shoes being movable lengthwise with respect to each other; and a spring reacting between said post and shoes opposing relative longitudinal movement of said post and shoes toward each other, said spring yieldingly rocking said shoes to swing toward said post.

2. In a friction shock absorber, the combination with a tapered friction post; of hingedly connected rocking friction shoes embracing said post at opposite sides, said post and shoes being movable lengthwise with respect to each other, said post and shoes having shouldered engagement with each other to limit relative longitudinal separation of the same; and spring means reacting between said shoes and post to oppose relative longitudinal movement thereof toward each other and rock the shoes toward said post.

3. In a friction shock absorber, the combination with a tapered friction post; of friction shoes embracing said post at opposite sides, said shoes having laterally, outwardly projecting base portions mounted for rocking movement at their outer ends, said base portions being pivotally connected to each other at their inner ends, said shoes and post being movable lengthwise with respect to each other; and spring means opposing relative longitudinal movement of said shoes and post toward each other, said spring means bearing on the base portions of said shoes to rock the same toward said post.

4. In a friction shock absorber, the combination with a tapered friction post; of tiltable friction shoes embracing said post at opposite sides, each shoe having a base portion extending laterally therefrom, said base portions being hingedly connected at their inner ends and fulcrumed at their outer ends, said shoes and post being slidable lengthwise with respect to each other; and spring means opposing relative movement of the shoes and post toward each other, said spring means bearing on said base portions of the shoes to resist tilting movement of the same.

5. In a friction shock absorber, the combination with a tapered friction post; of tiltable friction shoes embracing said post at opposite sides, each shoe having a base portion projecting laterally outwardly away from said shoe, said base portions being hingedly connected at their inner ends, said shoes and post being slidable lengthwise with respect to each other; and spring means opposing relative movement of the shoes and post in lengthwise direction toward each other, said spring bearing on the base portions of said shoes to resist tilting movement of the same.

6. In a friction shock absorber, the combination with a tapered friction post having laterally projecting stop flanges at its lower end; of tiltable friction shoes embracing said post at opposite sides, each shoe having a shoulder overhanging the stop flange at the corresponding side of the post to limit relative separation of the shoes and post in lengthwise direction, each shoe having a base portion projecting laterally outwardly away from said shoe, said base portions being hingedly connected at their inner ends, said shoes and post being slidable lengthwise with respect to each other; and spring means opposing relative movement of the shoes and post in lengthwise direction toward each other, said spring means bearing on the base portions of said shoes to resist tilting movement of the same.

7. In a friction shock absorber, the combination with a top follower plate member; of a post depending centrally from said member, said post having friction surfaces on opposite sides thereof converging toward the lower end of the same; a pair of friction shoes at opposite sides of said post hinged to each other for swinging movement toward and away from said post, said shoes being slidably engaged respectively with the friction surfaces of the post; a laterally, outwardly enlarged portion on each shoe at the lower end; a base plate on each shoe extending laterally outwardly from said enlarged portion; a follower collar having shouldered engagement with and bearing on said enlarged portion of each shoe; and a spring resistance surrounding said post and shoes and bearing at its top and bottom ends on said follower plate member and follower collar respectively.

GEORGE E. DATH.